United States Patent [19]
MacWilliam et al.

[11] Patent Number: 5,730,507
[45] Date of Patent: Mar. 24, 1998

[54] CABLE EXTENSION FOR BRAKE LOCK

[76] Inventors: Mark Wayne MacWilliam, X 419 Dovercourt Road,, Toronto, Ontario, Canada, M6J 3E8; George Meyer, 20909 R.R. #1, Alton, Ontario, Canada, L0N 1A0

[21] Appl. No.: 877,884

[22] Filed: Jun. 18, 1997

Related U.S. Application Data

[63] Continuation of Ser. No. 547,116, Oct. 23, 1995, abandoned.

[51] Int. Cl.$^6$ ............................................. B60T 17/16
[52] U.S. Cl. .................. 303/89; 188/353; 137/354; 137/384.8; 137/385; 137/864; 137/865; 70/256
[58] Field of Search ............................ 303/75, 890, 84.1, 303/84.2; 188/353, 265; 137/354, 384.8, 385, 864, 865; 70/175, 176, 179, 256, 257, 242.3, 30, 49; 292/DIG. 25; 475/189, 190, 346–48

[56] References Cited

U.S. PATENT DOCUMENTS

| | | | |
|---|---|---|---|
| 1,435,021 | 11/1922 | Omdal | 475/346 X |
| 2,202,422 | 5/1940 | Hoof | 70/256 X |
| 3,625,573 | 12/1971 | Conn | 188/353 X |
| 3,855,828 | 12/1974 | Verderber | 70/243 |
| 5,344,221 | 9/1994 | MacWilliam | 303/89 |
| 5,406,810 | 4/1995 | Chen | 70/49 X |

FOREIGN PATENT DOCUMENTS

2034393  6/1980  United Kingdom ............ 70/242

*Primary Examiner*—Josie Ballato

[57] ABSTRACT

A brake lock system is used in a vehicle having a brake line which feeds brake fluid to at least one brake member. The system comprises a brake line fittable housing having at least one fluid inlet and at least one fluid outlet. A flow control which controls the flow of brake fluid from each inlet to each outlet is provided within the housing. The flow control is movable from a first position which allows two way flow between the inlet and the outlet to a second position only allowing one way flow from the inlet to the outlet. Also provided within the housing is an operating member for moving the flow control. A controller which controls the operating member is provided remotely of the housing and a flexible drive shaft connects the controller to the operating member. The use of the flexible drive shaft permits a mounting position for the controller at a location different from that of the housing within the vehicle.

4 Claims, 8 Drawing Sheets

CABLE EXTENSION FOR BRAKE LOCK

This application is a continuation of application Ser. No. 08/547,116, filed Oct. 23, 1995, now abandoned.

FIELD OF THE INVENTION

The present invention relates to an anti-theft brake lock system for use in a vehicle and specifically to the mounting of the on/off controller remotely of the main operating housing of the system within the vehicle.

BACKGROUND OF THE INVENTION

In my own earlier U.S. Pat. No. 5,344,221 issued Sep. 6, 1994, I have described an anti-theft device for locking the brakes of a vehicle. The device fits directly into the brake line of the vehicle and when activated maintains constant brake pressure so that the vehicle cannot be driven. When the device is de-activated, the brake pressure is released allowing the vehicle to be driven in the normal fashion.

The device described in my above issued patent has proven to be extremely effective in the marketplace and since the issuance of the patent, variations of the original construction have been developed. These variations have resulted in a less expensive structure with enhanced installation capabilities of the device within a vehicle.

SUMMARY OF THE INVENTION

The present invention provides a brake lock system for use in a vehicle having a brake line which feeds brake fluid to at least one brake member within the vehicle. The system comprises a brake line fittable housing having fluid inlet means and fluid outlet means and fluid control means within the housing. The fluid control means is movable from a first position allowing two way flow between the inlet means and the outlet means to a second position allowing only one way flow from the inlet means to the outlet means. An operating member is also provided within the housing for moving the fluid control means.

In accordance with the present invention, a controller which controls the operating member is provided remotely of the housing and a flexible drive shaft connects the controller to the operating member. The use of the flexible drive shaft permits a mounting position for the controller at a location different from that of the housing within the vehicle.

BRIEF DESCRIPTION OF THE DRAWINGS

The above as well as other advantages and features of the present invention will be described in greater detail according to preferred embodiments of the present invention in which.

DETAILED DESCRIPTION ACCORDING TO THE PREFERRED EMBODIMENTS OF THE PRESENT INVENTION

Figure 1:
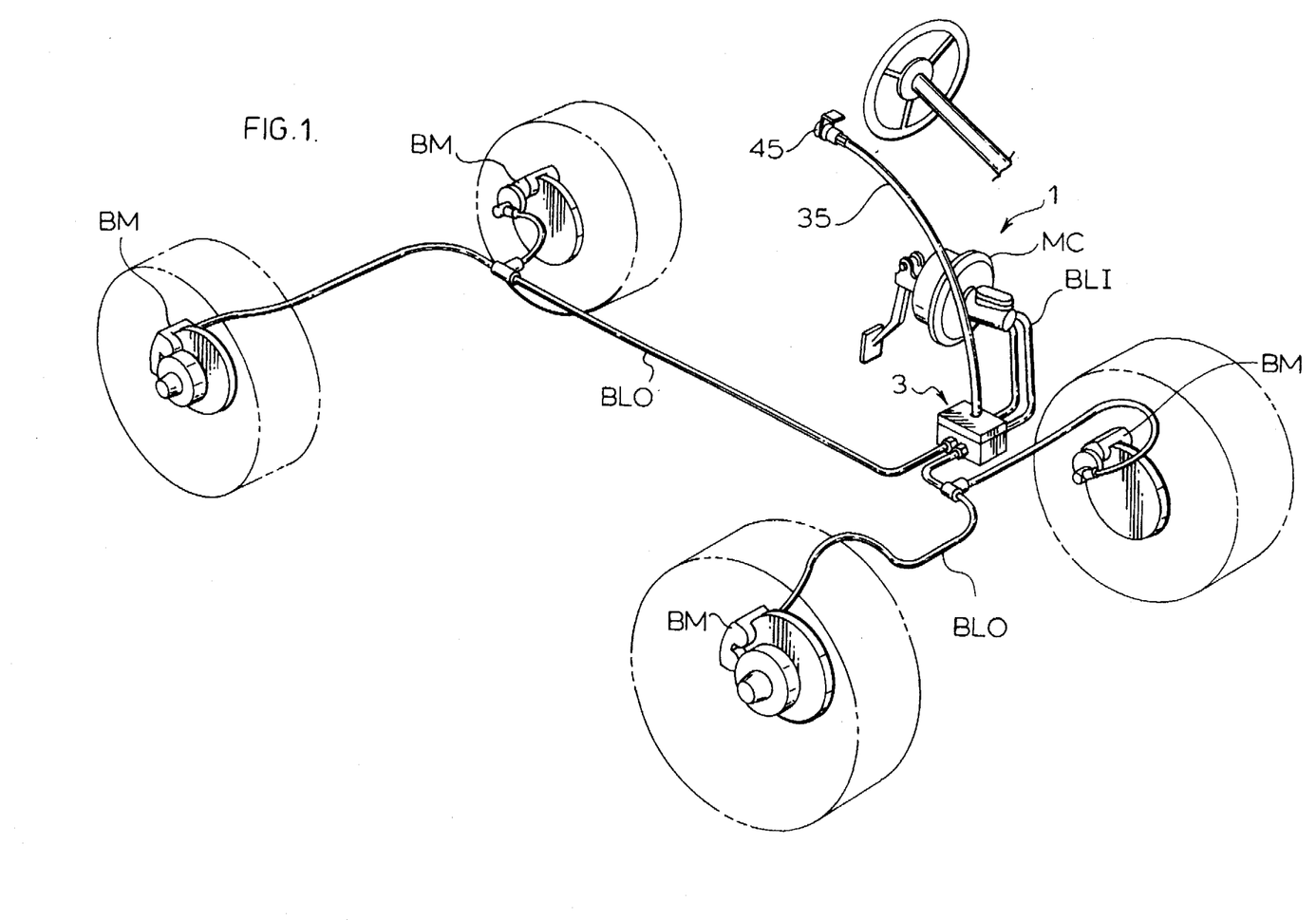
FIG. 1 is a schematic view of an automobile fitted with a brake lock system in accordance with a preferred embodiment of the present invention.

FIG. 1 shows the skeleton construction of a vehicle, i.e. an automobile generally indicated at 1. This automobile includes the standard wheels as shown in FIG. 1 with a brake member BM associated with each of the wheels. Each of the brake members is fed brake fluid through a standard master cylinder MC by a brake line which, in FIG. 1, has two designations BLI and BLO.

When pressure is applied on the actual brake pedal, brake fluid is fed from the master cylinder MC along BLI (brake line in) through housing 3 and then along BLO (brake line out) to the various different brake members.

Housing 3 which is well shown in FIGS. 4 through 7 of the drawings comprises a main lower housing portion 3a and an upper housing portion or cover 3b. When the housing is fully assembled with the working parts of the brake lock system encased in the housing, the upper cover is secured to the lower housing portion by anti-tampering securing members such as flat headed rivets 4 which are counter-sunk into the cover as will be apparent for example from FIG. 4 of the drawings.

Figure 6:
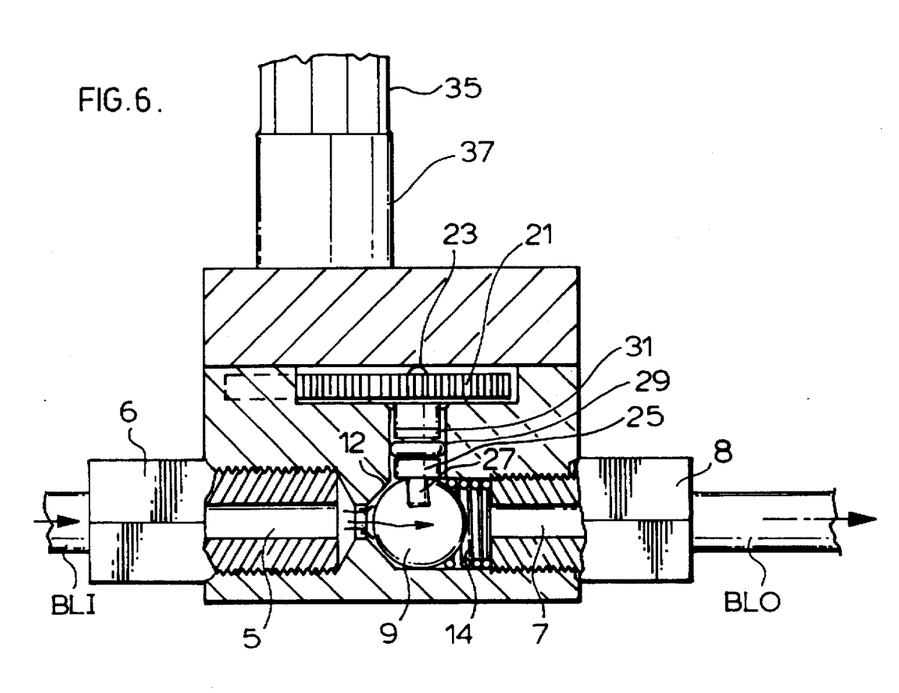
FIGS. 6 and 7 are sectional views looking from the side of the housing of FIG. 4 when fully assembled and showing different operating positions of the system.
Figure 7:
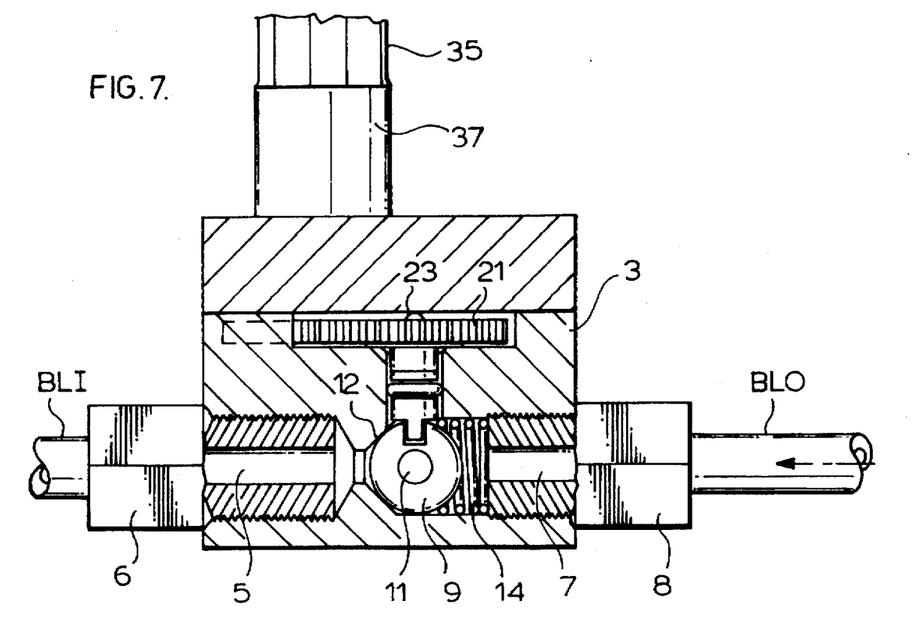

The housing as seen for example in FIGS. 6 and 7 includes fluid flow inlets 5 and fluid outlets 7. In the particular construction shown, there are two fluid flow inlets and two fluid flow outlets. The inlets and the outlets align directly with one another through the housing.

The brake line end BLI consists of two separate line members, each of which is fitted with a threaded connector 6 for threading into the housing inlets 5. The BLO also comprises two separate line members fitted with threaded connectors 8 which are threaded into the outlets 7 of housing 3.

Provided internally within the housing are a pair of valves and in particular rotary ball valves 9. These two ball valves are fitted between the aligned inlets and outlets of the housing. An inclined surface of the housing provides a seat 12 on the inlet side 5 of the valve. A spring 14 which is trapped within the housing by the threaded connector 8 provides spring pressure to urge the ball valve towards seat 12.

Conceptionally, the above arrangement is very similar to my earlier issued patent, however from a specific construction standpoint, there are only two ball valves provided in the present design and as noted above, in the present application, the brake line inlet and the brake line outlet directly align with one another through the housing. This provides a very simple efficient flow path for the brake fluid which will be described later in detail.

Each of the ball valves 9 includes a central bore 11 and the ball valves can be turned as shown in FIG. 6 such that the central bore aligns with the inlet 5 and the outlet 7 or the ball valves can be turned 90° from the FIG. 6 position to the FIG. 7 position where the ball valves block off the flow through passage from the inlet 5 to the outlet 7.

When the ball valve is in the FIG. 6 flow through position, the brakes of the automobile operate in the normal fashion. When the ball valve is in the FIG. 7 position, the brake lock system operates to prevent theft of the vehicle.

Additionally provided within housing 3 is operating means for determining the positions of the two ball valves. Here it should be noted that the ball valves are set up consistently so that they both either block or allow fluid flow through the housing at the same time with one another.

Figure 4:
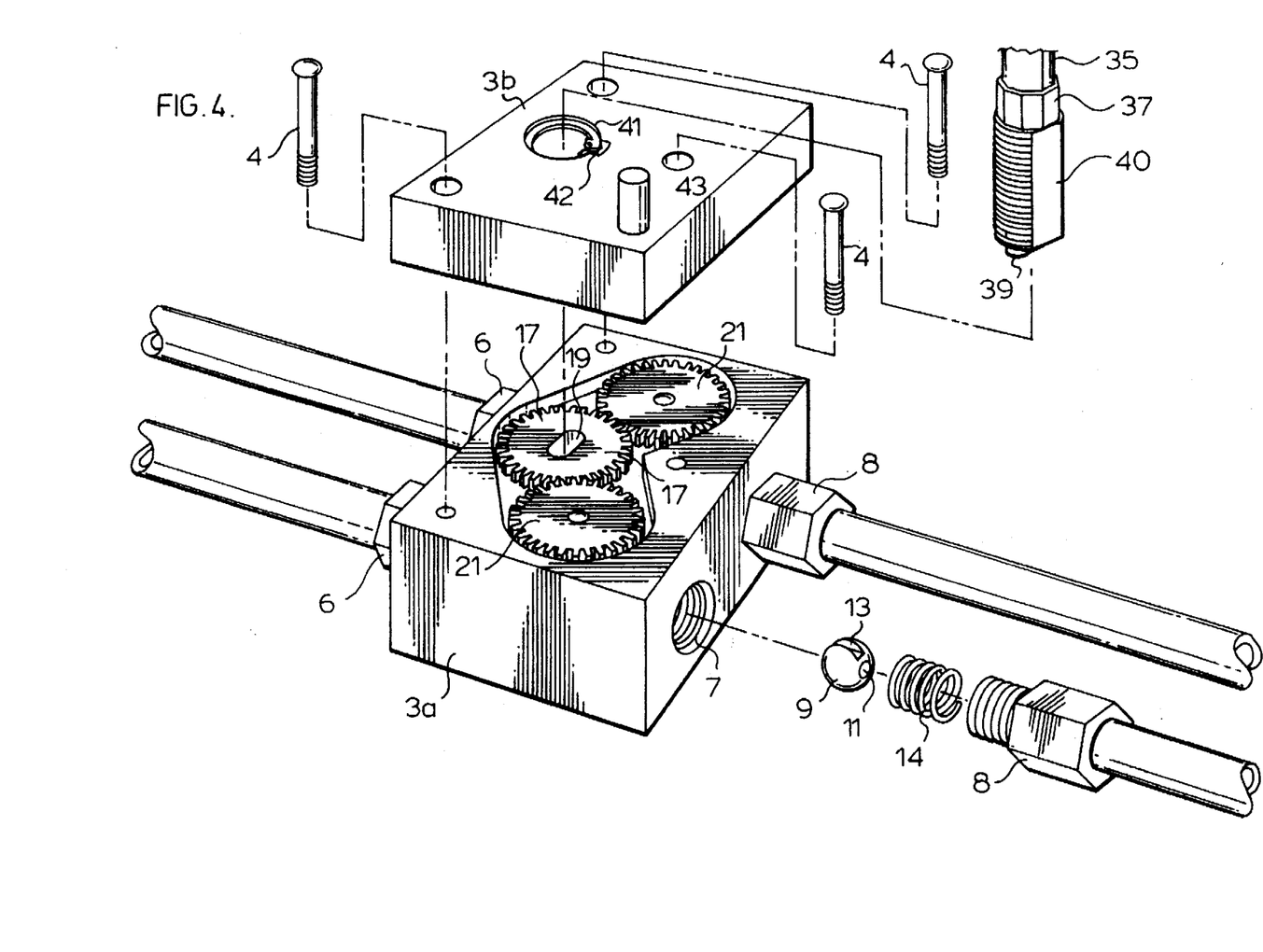
FIG. 4 is an exploded perspective view of the brake lock fittable housing of the system shown in FIG. 2.
Figure 5:
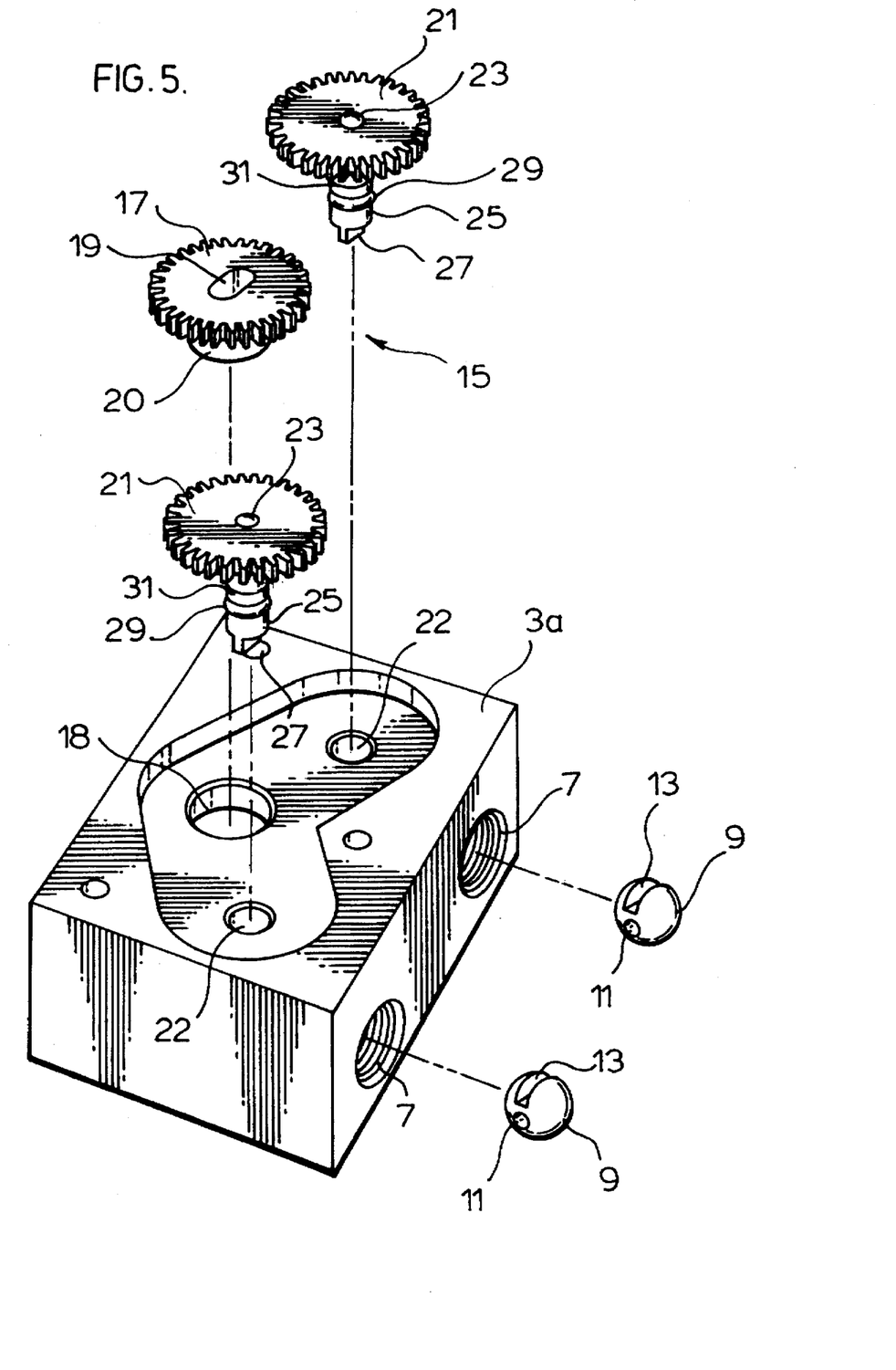
FIG. 5 is a further exploded perspective view of the housing of FIG. 4.

The control means for the ball valves comprises a gear arrangement as is well shown in FIGS. 4 and 5 of the drawings. This gear arrangement comprises a primary gear 17 and a pair of secondary gears 21 which mesh with the primary gear. The primary gear includes an elongated groove or slot 19 which receives the end of a flexible drive shaft for rotating the primary gear. Both the primary and the secondary gears are contained within the housing 3 and the end of the drive shaft threads through the cover to engage the primary gear.

Each of the secondary gears includes a lower leg 25 having a bottom tongue 27. Each of the ball valves 9 has an upper slot 13 into which the tongues 27 of the gears 21 are fitted. The lower legs of the secondary gears are also provided with O-ring seals 29 which prevent brake fluid from escaping upwardly past the gears and these O-rings 29 are held in position by Teflon™ retainers 31 which prevent upward creeping of the O-rings themselves.

The legs 25 of the secondary gears 21 extend down through openings 22 in the housing to reach the ball valves as shown for example in any one of FIGS. 6 through 9. The primary gear 17 includes a bottom leg 20 which drops down into an opening 18 in the housing so that the primary gear is trapped against movement other than rotation within the housing when the cover is secured in position.

Figure 8:
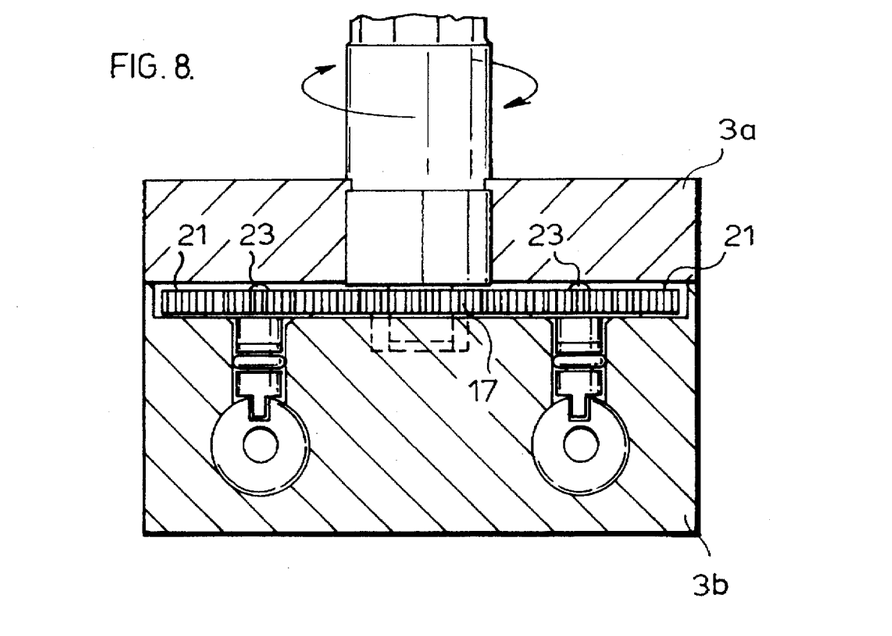
FIGS. 8 and 9 are end views of the housing of FIG. 4 when fully assembled and again showing different operating positions of the system.
Figure 9:
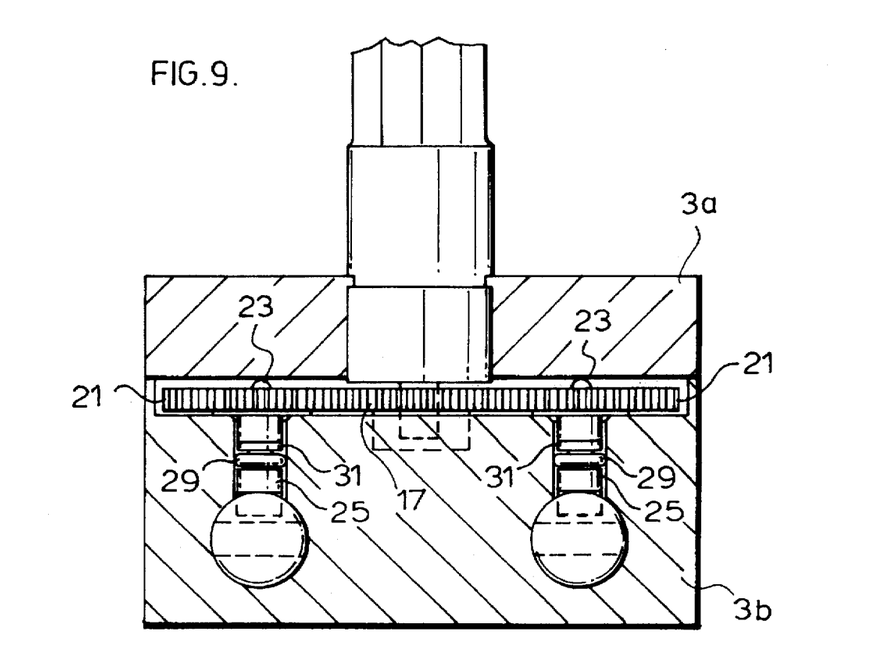

In order to ease the rotation of the two secondary gears 21, each of these gears is provided on its upper surface with a small rounded contact point 23 on which the cover 3a of the housing 3 seats as shown for example in FIGS. 8 and 9 of the drawings so that the secondary gears are trapped against upward shifting in the housing with minimal friction against the two secondary gears.

The key to the present invention resides in the fact that housing 3 with all of the brake fluid flow controlling features as described above and contained within the housing can be fitted essentially anywhere into the brake line without having to worry about the location of the on/off control for the system. This extremely beneficial feature is achieved because the control itself is located remotely of and connected back to the housing through a flexible drive shaft as noted above and as generally indicated at 35 shown in FIGS. 1, 2 and 3 of the drawings.

Figure 3:
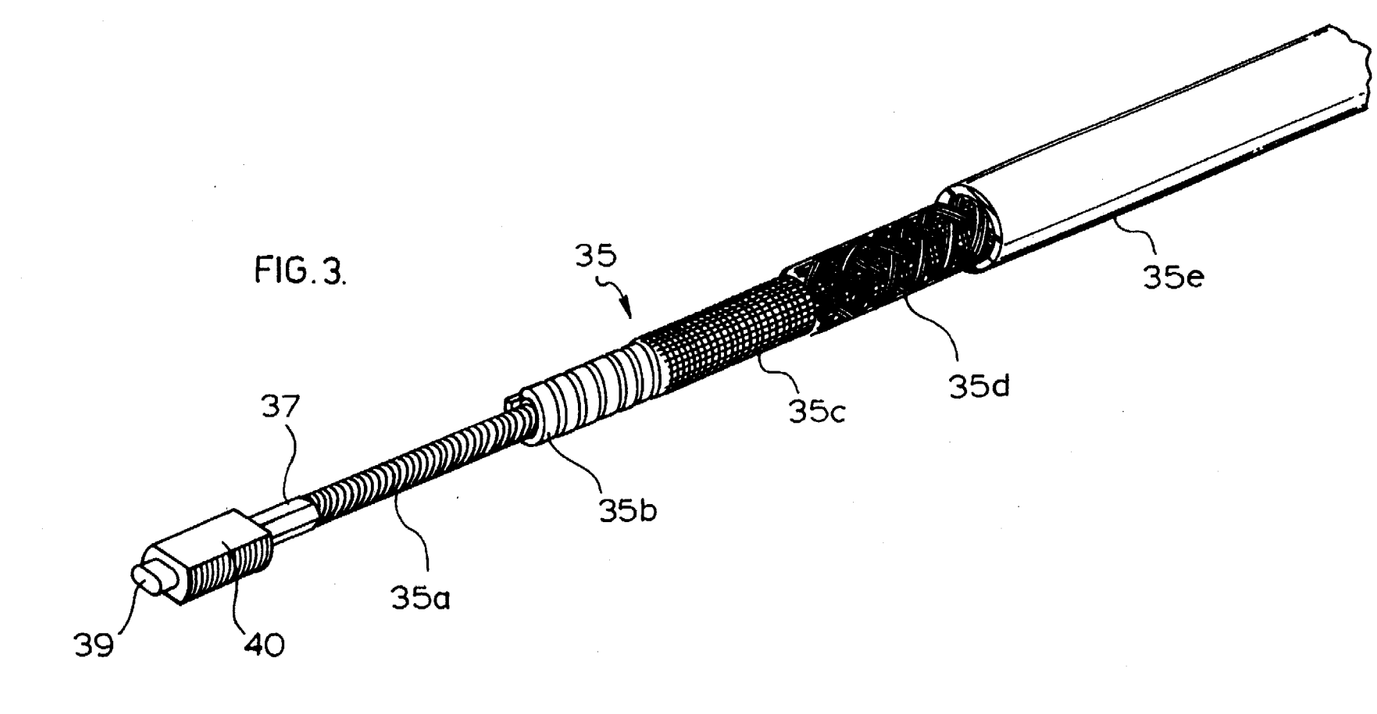
FIG. 3 is a perspective view of the drive shaft from the system on FIGS. 1 and 2 with portions of the drive shaft removed to show its internal construction.

Drive shaft 35 has a multiple layer internal construction with a protective cover over the internal layers. More particularly and as best seen in FIG. 3 of the drawings. The drive shaft is formed by internal layers 35a through 35d with a casing or cover 35e over the internal layers. The internal layers themselves are designed once again against tampering of the system. They are specifically made such that it is extremely difficult to cut through the drive shaft. For example, the most central core member 35a of the shaft is formed by a helically wound metallic filament. The winding of the filament is sufficiently tight such that the central core member 35a is able to transfer torque along its full length for rotating the primary gear 17 which in turn causes rotation of the two secondary gears 21. However at the same time, through the use of a helical winding in the central core, it becomes much more difficult to cut then for example a conventional one piece core member.

Provided around the central core 35a is the secondary layer member 35b which in this case is again a helically wound metallic filament. A pair of metallic braided layers 35c and 35d are then provided over the two inner layers 35a and 35b. As will be seen in FIG. 3 of the drawings, each of the braided layers has a different formation configuration from one another as well as the two inner core layers and all of the layers have different densities from one another. This overall construction makes the shaft extremely resistant against cutting or other types of damage of the shaft.

The lower end 37 of the shaft is provided with a bottom foot 39 which is of the same configuration as and fits into the oval slot 19 of the primary gear 17. The foot of the shaft is held in position by threading the shaft end 37 through a threaded opening 41 in the top cover 3b of housing 3. The shaft end 37 is provided with a flat 40 along its side face and opening 41 in the cover is provided with a semi-circular notch 42 to one side of the opening. A flat sided pin 43 drops down into the opening 42 and cooperates with the flat face 40 of the shaft end 37 to prevent unauthorized unthreading of the shaft end from the housing.

Figure 10:
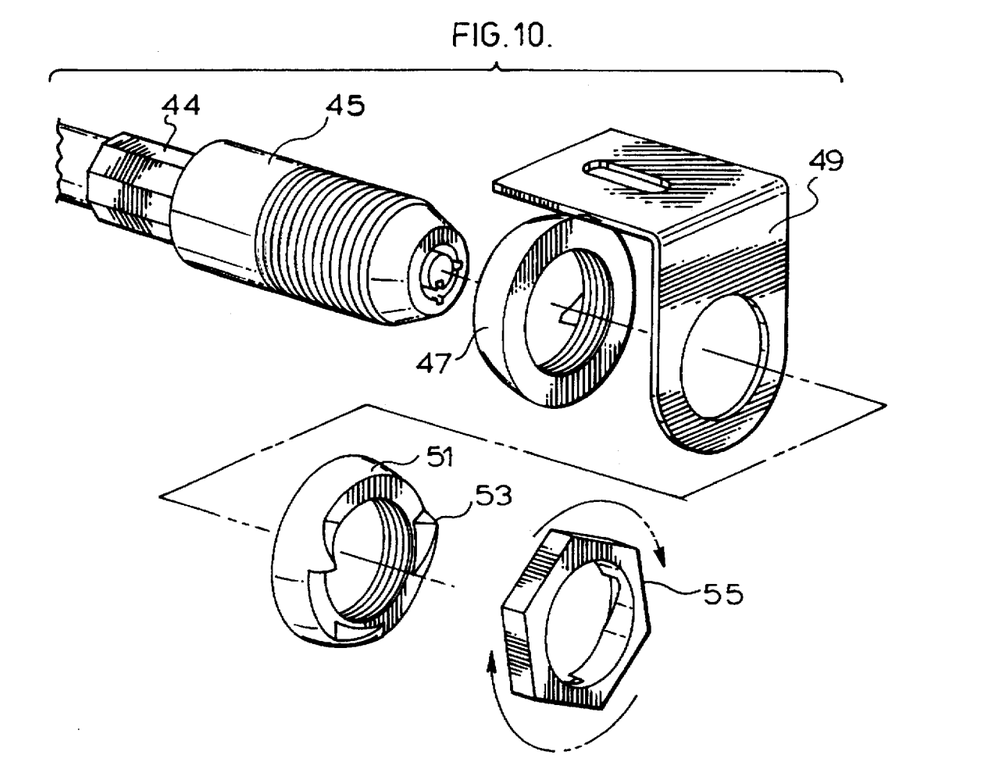
FIG. 10 is an exploded perspective view of one end of the drive shaft from the system of FIGS. 1 and 2.

The other end of the shaft, indicated at 44 and shown in FIG. 10 of the drawings, is fitted with the on/off controller for the system which causes rotation of the gears within housing 3. In this particular arrangement, the on/off controller is in the form of a lock cylinder 45 operated by a key 46 shown in FIG. 2 of the drawings.

Returning to FIG. 10, lock cylinder 45 because of the flexible extended length of shaft 35 can be located almost anywhere in the vehicle. Its positioning is not dictated by the position of housing 3. This not only frees up the location for the controller, but also frees up the location for the housing anywhere within the brake line.

Figure 11:
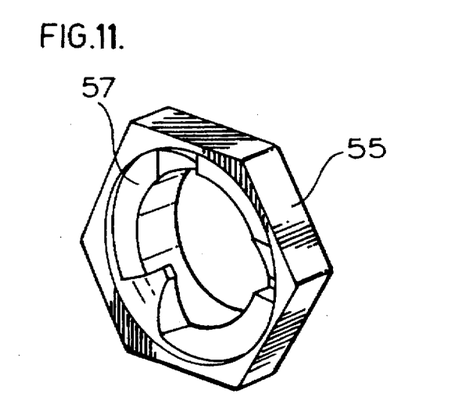
FIG. 11 is a perspective view of the tool used in securing the one end of the drive shaft shown in FIG. 10 to a mounting bracket.

One particularly effective method of mounting the lock cylinder 45 is through the use of a bracket 49. Again, the securing of the lock cylinder to the bracket is done in a tamper resistant manner. First and second threaded nuts 47 and 51 thread onto the lock cylinder from opposite sides of the bracket. Each of these nuts is provided with raised faces 53 which are flat when approaching the faces in the threading direction and which are cammed in the unthreading direction. A specially designed tool 55 having recesses 57 in one face of the tool is used to thread the two nuts 47 and 51 onto the cylinder locking it with bracket 49. Once the two nuts are threaded into position, they are essentially unremovable without destroying the two nuts. The bracket itself can be mounted in any appropriate location within the automobile, as for example, directly under the dash board.

It is to be appreciated that the bracket is not required and that the cylinder can be mounted by any other effective means at different desired locations within the automobile.

As earlier noted, when the system is not activated, the two ball valves 9 are turned such that there is an open or two way flow path through the housing 3 and the brakes operate in their normal fashion. However, when the system is activated, ball valves 9 are rotated by the primary gear 17 through the secondary gears 21 to turn such that the bores 11 of the ball valves are at right angles to the flow paths through the housing, i.e. the ball valves are turned from the FIG. 6 system off position to the FIG. 7 system on position. In the FIG. 7 position, the ball valves will allow a certain amount of brake fluid to flow from the inlet side of the housing to the outlet side of the housing but will not allow return flow of the brake fluid back to the inlet side of the housing. This then traps the brake fluid between the housing and the brake members and the pressure of the trapped brake fluid causes the brakes to be applied until the system is de-activated at which point, the brake fluid can flow back through the ball valve towards the master cylinder.

FIG. 7 of the drawings shows that the fitting between the tongue 27 of the gear leg 21 and the upper slot in the ball valve is slightly loose or sloppy. Therefore, when the operator of the vehicle leaves the car, he or she can simply depress the brake pedal which will cause the brake fluid to apply sufficient pressure on the ball valve to lift it off of the seat 12 against the pressure applied by spring 14. As described immediately above, a small amount of the brake fluid will then move past the ball valve 9 to apply pressure on the brakes. The spring 14 will push the ball valve back onto its seat 12 to trap the brake fluid pressure between the housing and the brake members.

This same brake lock action will occur by anyone who enters the vehicle as for example an automobile thief who then steps on the brake pedal when the system is activated.

Figure 2:
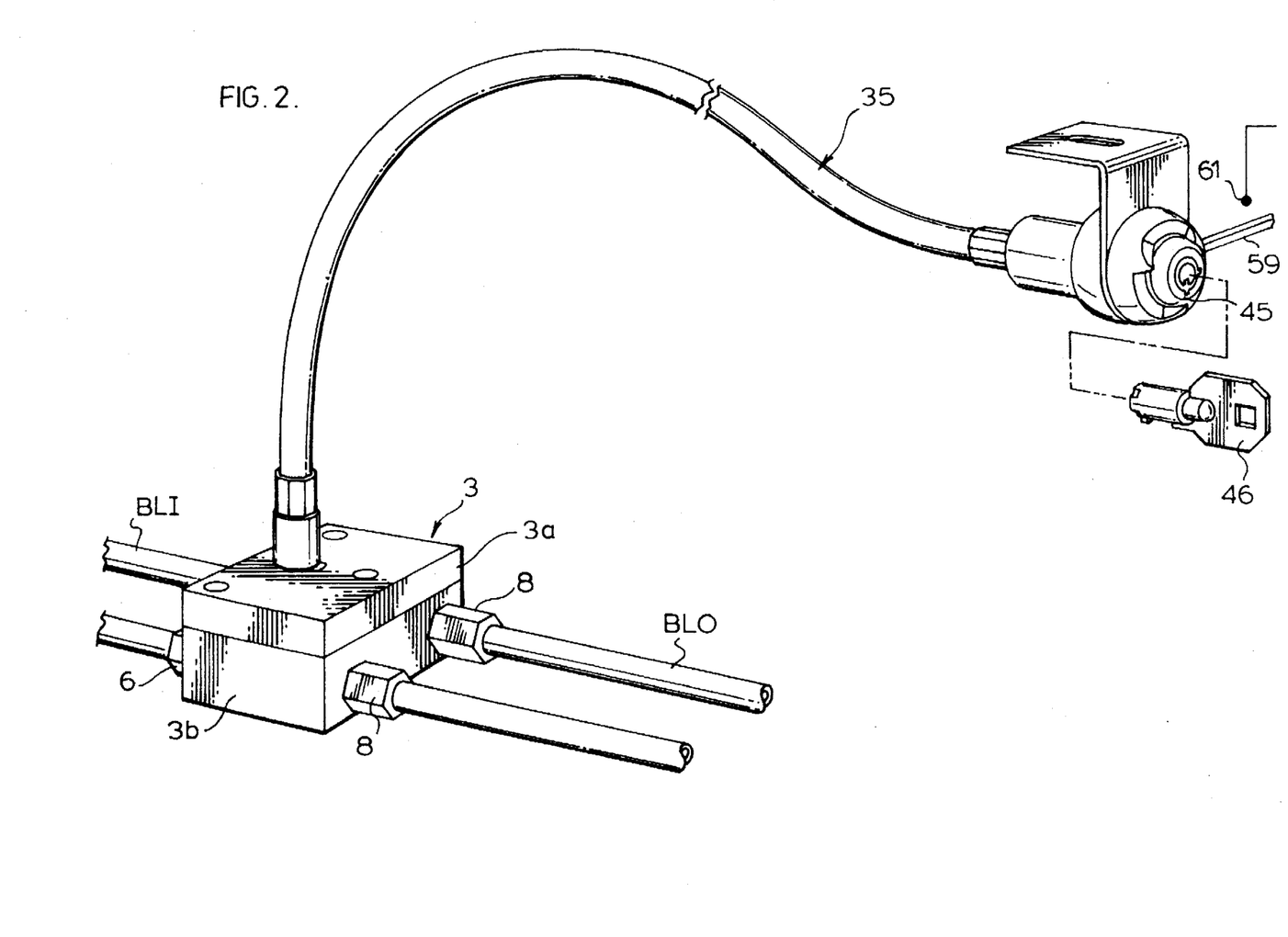
FIG. 2 is an enlarged perspective view of the brake lock system from the automobile of FIG. 1.

As a further automotive theft deterrent, the system of the present invention can also be provided with an ignition disconnect switch which opens the ignition system and will not allow the vehicle to be turned on when the brake lock system is activated. One example of such a set up is shown in FIG. 2 of the drawings where a switch member 59 is operated by rotation of the lock cylinder 45 of the brake lock system. This switch pulls away from any ignition contact 61 when the brake lock system is turned on so that the vehicle won't start and it is only by turning the brake lock system off, i.e. by rotating cylinder 45 that switch 59 closes with contact 61 allowing the vehicle to be started.

The above vehicle ignition control is also of assistance to the authorized driver of the vehicle so that he or she will be forced to turn the brake system off before starting the vehicle.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A brake lock system for use in a vehicle having a brake line which feeds brake fluid to a plurality of brake members, said system comprising a brake line connectable housing and an elongated flexible drive shaft, said housing having a plurality of fluid passages therethrough, an inlet to and an outlet from each passage, a valve in each passage, each valve being rotatable to provide either one way or two way flow through the passage, a plurality of valve gears, one for each valve, each valve gear consisting of a main gear body having a valve engaging stem to one side and a friction reduction member to the other side of the main gear body, a drive gear which simultaneously rotates all of said valve gears, said drive gear and said valve gears being located within a gear receiving recess of said housing, a cover secured to said housing by tamper resistant securing members, said cover trapping all of said gears in said housing with said friction reduction members of said valve gears abutting said cover, said cover having an opening therethrough to said drive gear, said drive shaft having a first end remote from said housing provided with a shaft rotator and a second end provided with a gear rotator which is fittable through the opening in said cover to couple said gear rotator to said drive gear after said cover is secured to said housing, and tamper resistant locking means to lock said second end of said shaft to said cover.

2. A brake lock system as claimed in claim 1, wherein said drive gear has a non-round recess therein aligned with the opening in said cover, said gear rotator on said second end of said drive shaft being shaped to fit against rotation in the recess in said drive gear.

3. A brake lock system as claimed in claim 1, wherein said second end of said drive shaft threads into the opening in said cover, the opening being provided with a recess into which a lock pin is fitted after said second end of said drive shaft is threaded into the opening in said cover, said lock pin preventing unthreading of said second end of said drive shaft from the opening in said cover.

4. A brake lock system as claimed in claim 1, wherein said plurality of fluid passages comprises a pair of straight passages through said housing.

* * * * *